Jan. 9, 1968  J. F. STOCKI ETAL  3,362,408
BODY CAVITY EXAMINING AND INSTRUMENT ASSEMBLY
Filed May 25, 1965

INVENTORS
John F. Stocki &
Henri F. Wendel

BY  *Birch & Birch*

ATTORNEYS

3,362,408
**BODY CAVITY EXAMINING AND
INSTRUMENT ASSEMBLY**
John F. Stocki and Henri F. Wendell, Wilmington, Del.,
assignors to Stowen Scientific Company, Wilmington,
Del., a corporation of Delaware
Filed May 25, 1965, Ser. No. 458,545
2 Claims. (Cl. 128—314)

ABSTRACT OF THE DISCLOSURE

In combination with a plastic medical examining glove of a very thin plastic material and having a receiving pocket portion, a thin flat surgical lance adapted to be urged forward into operating position after a pre-determined period examination.

---

Figure 1:
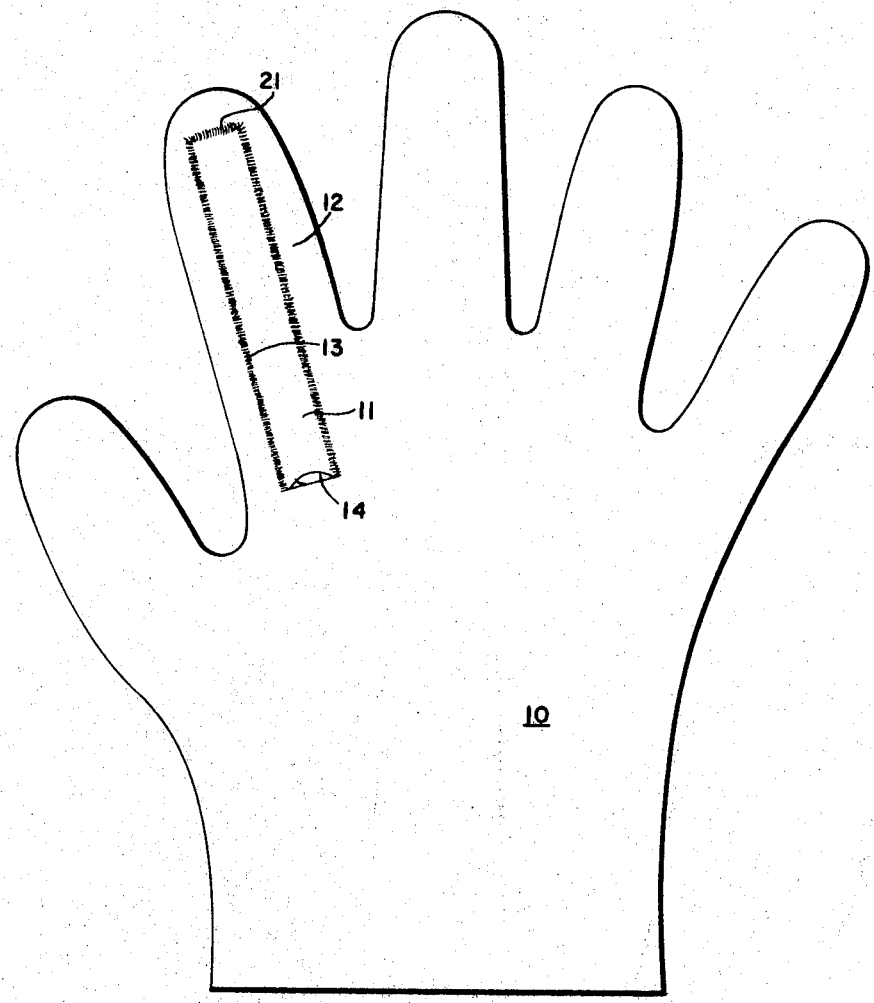

The present invention relates generally to obstetrics and more particularly to an obstetrical arrangement used by physicians to assistant the mother during the early stages of labor in childbirth or parturition, safely permitting rupture of the mother's amnionic membranes enveloping the fetus in the uterus.

The obstetrician during parturition often wears sterile plastic examination gloves and when examining the patient determines by the dilated condition of the cervix, the approximate stages of labor. With such examination by the attending physician, the mother's early labor may be materially aided when the attending physician punctures the patient's amnionic membranes releasing the water from around the fetus.

Heretofore, the attending physician has used various systems to rupture the amnionic membranes or water holding sac enveloping the fetus, for example, the physicians have used some form of sharp instrument or even may use their sharpened fingernail to rupture the amnionic membranes, but unless caution during this operation is provided to have sterile fingernails and/or sterile instruments, infection in some form may develop. Sterilized examining and operating conditions are greatly enhanced by the use of plastic gloves; and accordingly, it is an object of the present invention to provide a novel membrane rupture means adapted to be used in combination with such gloves, whereby the membranes forming the amnion or the water sac may be ruptured efficiently and safely, free of likely infectious results.

Another and more specific object is to provide a novel arrangement for rupture of the amnionic membranes during parturition, comprising a novel combination of a medical examining plastic glove, which may be of very thin polyethylene, for example .002 to .005 inch thick, with an elongated pocket of the same material adapted to be positioned on the palm side of the hand and secured longitudinally to a selected finger of the glove, whereby a novel membrane rupturing instrument shaped and proportioned to coactively fit in the pocket, may be kept pocketed during examination and subsequently guided and projected during finger examination by the finger calculated proper manipulation of the instrument to rupture the sac membranes.

A further object is to provide a plastic hand covering for physician use during body cavity examination with a specific examining gloved finger portion including a pocket with an open top portion for holding an operating instrument formed longitudinally along one or both sides of the gloved finger portion.

Still another object is to provide a novel lance, said lance having a gauge stop means, whereby the amnionic membranes may be safely ruptured in the early stages of labor.

Yet another object is to provide a novel plastic examining glove having a finger mounted examing portion with an elongated pocket or tubular section secured to each opposite side for receiving an amnionic membrane puncture means.

Another object is to provide as an alternate form of the invention a separate finger mounted unit comprising two sleeve members secured together adapted to be used with or without an examining glove.

The above and other objects and advantages of this invention will appear more fully hereinafter from a consideration of the detailed description which follows taken with the accompanying drawings, wherein two embodiments of apparatus used to practice the invention are illustrated. It is to be expressly understood, however, that the drawings are for the purpose of illustration only and are not intended as a definition of the limits of the invention; reference for this purpose should be had to the appended claims.

Figure 2:
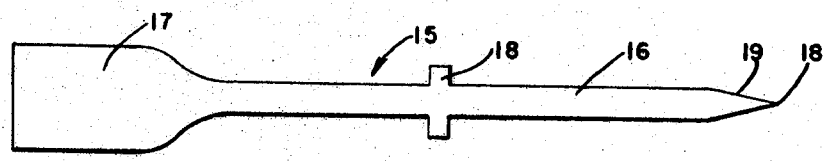

In the drawings wherein like reference characters refer to like parts throughout the several views:

FIGURE 1 is an elevation view of one side of a disposable plastic glove made in accordance with the present invention and wherein the opposite side is identical thereby providing ambidextrous use with the probe or lance pocketed therein; and FIGURE 2 is a plan view of one side of a membrane rupture probe or lance removed from the glove adapted to be positioned in one of the tubes or pockets secured to a suitable finger portion of the glove, each side of the probe or lance being of duplicate form;

Referring to the drawings and first with particular reference to FIGURE 1, there is illustrated a novel thin film plastic glove 10 made from tissue-thin polyethylene sheet or the like, for example from .002 to .005 inch thick. This glove has the usual finger portions and is novel in the formation of a pocket 11 on one or both opposite sides of one of the glove fingers, such as the finger 12, for example.

These pockets 11 are each secured by a heat seam 13 from the open lip 14 of the pocket or they may be otherwise formed integrally with the material of the finger 12. Either of the pockets is for receiving the shank portion 16 of a probe or lance 15, which probe or lance comprises a handle 17, a gauge bar 18 transverse the shank at the lower end of the handle and a sharp cutting edge 19 and point 20 on the shank normally confined in the pocket 11 at the sealed bottom 21 thereof, see FIGURE 2.

As illustrated in FIGURE 2, the lance 15 is freely removable from the pocket 11 and when inserted in the pocket with point 20 at the bottom 21 the gauge bar 18 is spaced slightly above the pocket lip 14. The gloved finger tip of a user extends a predetermined distance beyond the bottom of the pocket 11 to provide for finger examination of the cervix before projecting the probe or lance through the bottom 21 of the pocket to operating positions to rupture the amnion.

When the lance 15 is projected through the pocket bottom 21, the point 20 and cutting edge 19 are exposed exteriorly next to the gloved finger tip of the operating physician, who by feel can control and determine the proper projection of the lance point for safe rupture of the amnionic membranes to simplify the early labor stage. Also, it is to be noted that the present novel glove arrangement with a pocket on each side permits examination with either the left or right hand, so the pocket loaded with the probe or lance 15 may be positioned adjacent the user's left or right palm as desired.

Thus there is provided a novel disposable combination in a sterilized individually packaged arrangement for use by an examining physician in the early stages of parturition, whereby injury is precluded to child, mother or doctor. Also, there is provided a novel glove with an examining finger portion and pocket which retains and guides a novel probe or lance including a safety gauge to proper positions to safely rupture the amnionic membranes without discomfort to the patient.

Without further description it is believed that the advantages of the present invention over the prior art are apparent and while only two embodiments of the same are illustrated, it is to be expressly understood that the invention is not limited thereto as various changes may be made in the combination and arrangement of the parts illustrated, as will now likely appear to others and those skilled in the art. For a definition of the scope or limits of the invention, reference should be had to the appended claims.

What is claimed is:

1. In combination, a body cavity examining glove and an instrument, said glove being of thin flexible material having fingers, one of said fingers being a body cavity examining finger, a pocket on at least one side of said body cavity examining finger, said pocket having bottom and side portions sealed to said examining finger and being open opposite to said bottom portion, said open part of the pocket having a lip, and said instrument being a lance member, said lance including a shank, a handle at one end, a pointed cutting edge at the opposite end, said shank and said pointed cutting edge being confined within the said pocket with the pointed cutting end adjacent the sealed bottom portion of the pocket and the said handle being adjacent the lip of the pocket, said pocket carrying finger of the glove extending longitudinally a predetermined distance beyond the bottom portion of said pocket to provide a smooth tip area to permit finger examination of a body cavity before projecting the pointed cutting edge of said lance through the sealed bottom portion of the pocket and from the bottom portion of the pocket to operating position adjacent the said tip area of the finger portion.

2. In combination, as described in claim 1, wherein the body cavity examining finger of the glove includes a pocket on each opposite side thereof to provide ambidextrous use.

References Cited

UNITED STATES PATENTS

| | | | |
|---|---|---|---|
| 1,755,777 | 4/1930 | Frederiksen | 128—314 |
| 2,668,536 | 2/1954 | Farries et al. | 128—305 |

LOUIS G. MANCENE, *Primary Examiner.*

RICHARD A. GAUDET, *Examiner.*

G. E. McNEILL, *Assistant Examiner.*